July 5, 1955 C. E. SMITH 2,712,198
CROP DUSTING MACHINE
Filed Dec. 8, 1952 3 Sheets-Sheet 2
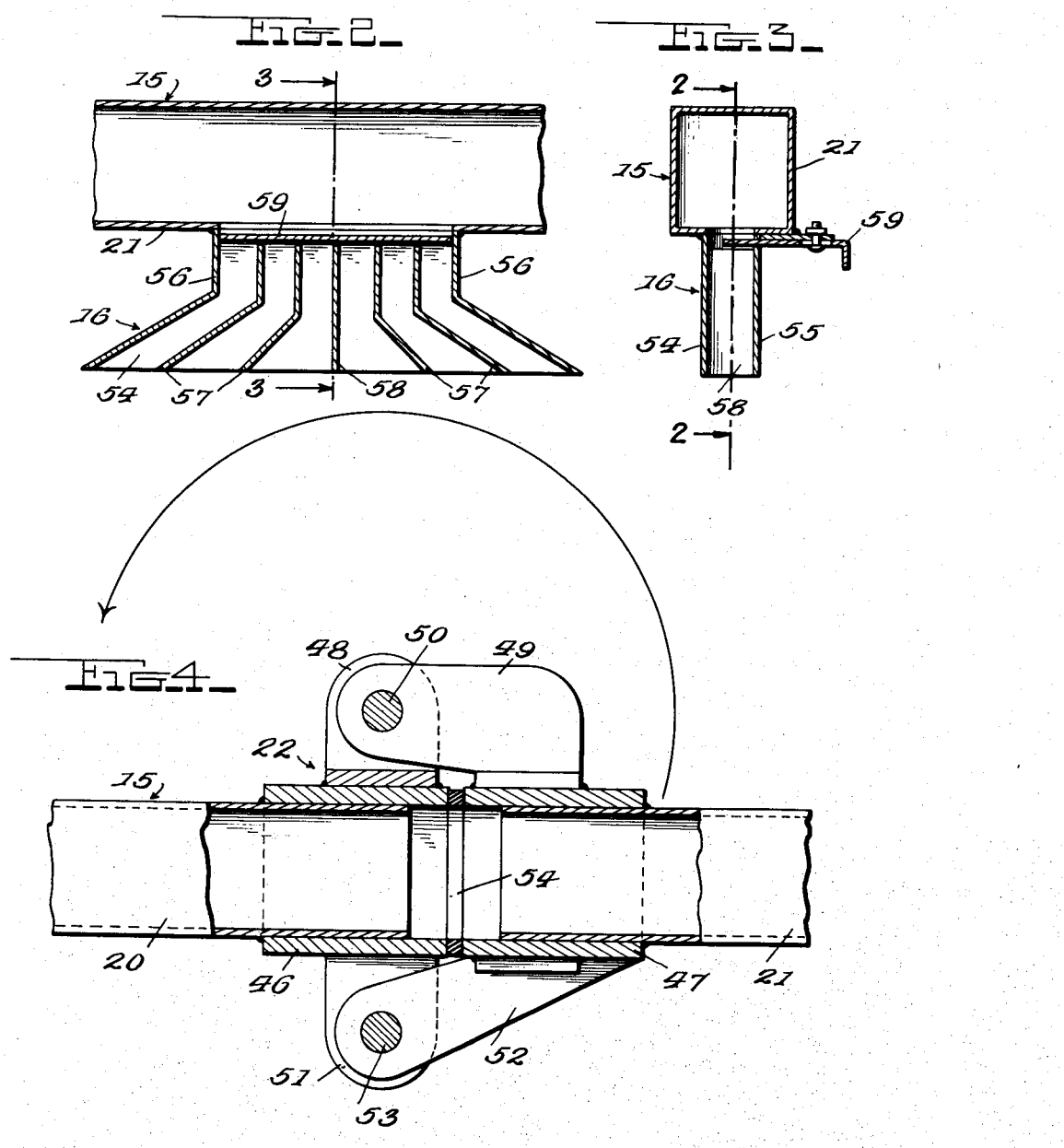
INVENTOR.
C. E. Smith
BY
atty.

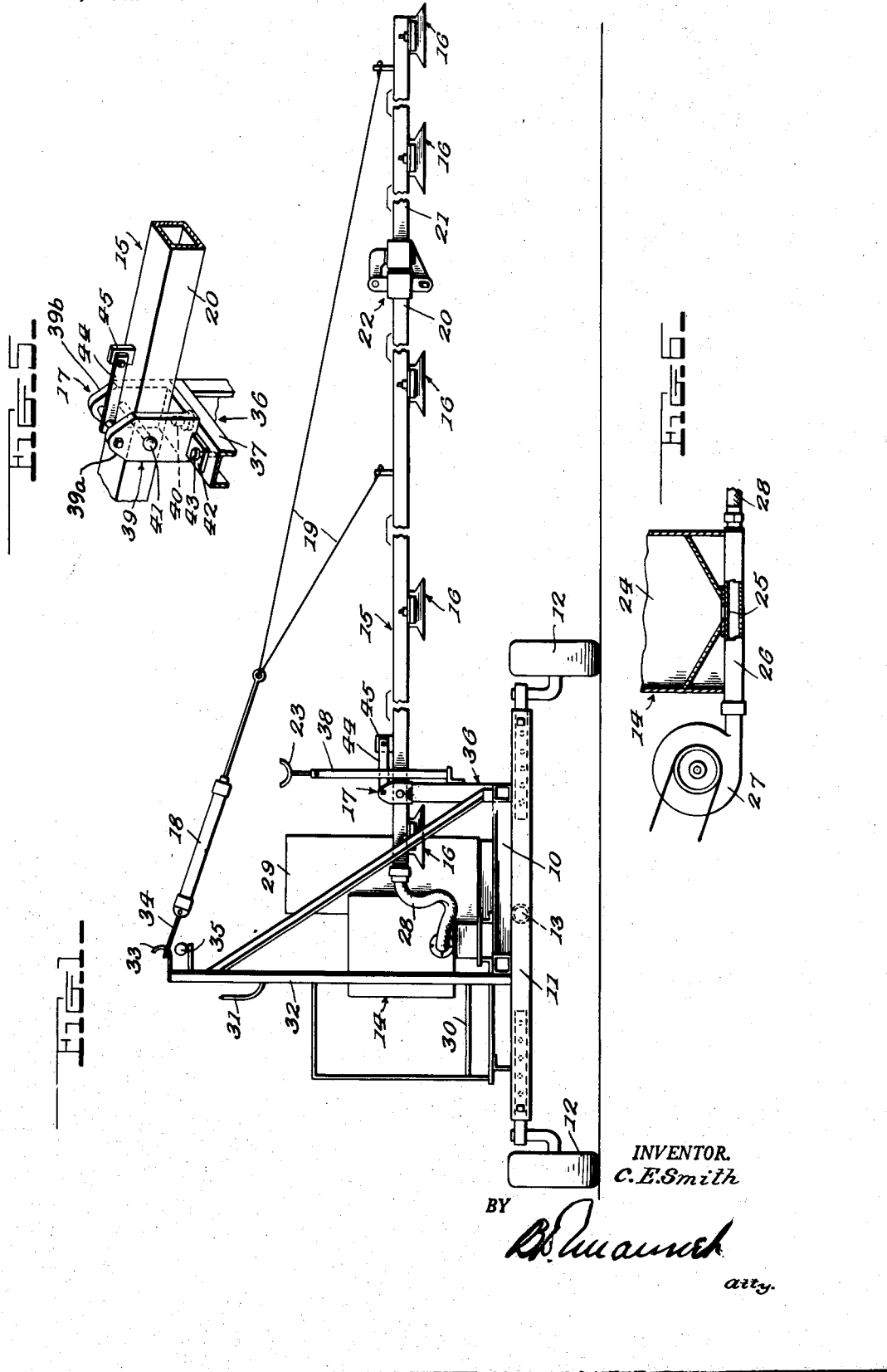

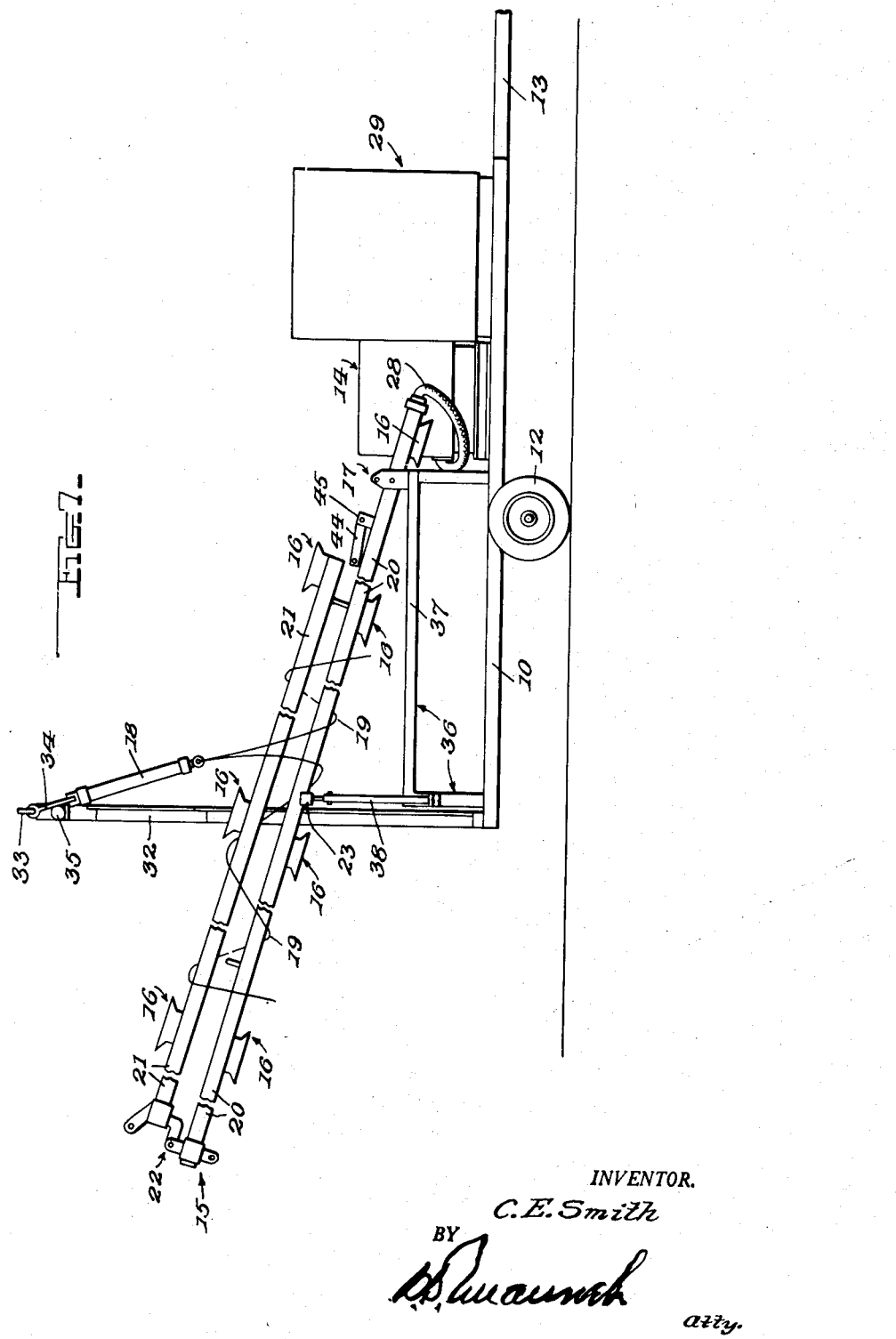

United States Patent Office 2,712,198
Patented July 5, 1955

2,712,198

CROP DUSTING MACHINE

Clarence E. Smith, Sharpsville, Ind.

Application December 8, 1952, Serial No. 324,660

3 Claims. (Cl. 43—148)

This invention relates to a new and useful machine to be drawn by a tractor upon a field to simultaneously spray an insecticide dust upon a plurality of rows of plants.

One object of the invention is to provide a novel machine having a long boom provided with spaced dusting nozzles, said boom being swingable to a lateral position for use and to an idle position in which it extends longitudinally of the machine when the latter is to be moved from place to place, thus permitting easy movement along roadways through gateways and the like.

Another object of the invention is to provide the boom in two longitudinal sections hinged together, the outer section being swingable onto the inner section when the machine is to be moved from one place to another, thus avoiding excessive projection of the boom to the rear of the wheeled chassis of the machine.

Yet another object is to make novel provision for mounting the boom and for holding it in its operative position.

A further object is to provide the boom of tubular form, whereby the boom itself conducts the dust to the nozzles instead of requiring other dust conducting means.

A still further object is to provide novel nozzles for spraying the dust in any required amount per acre and for giving almost one hundred percent coverage by blowing the dust through the foliage of the plants.

Yet another object of the invention is to provide a dust spray machine sufficiently rugged to carry a large supply of sacked dust in readiness for use instead of having to haul the dust to the machine in the field.

With the above and other objects in view that will become apparent as the nature of the invention is better understood, the same consists in the novel form, combination and arrangement of parts hereinafter more fully described, shown in the accompanying drawings, and particularly claimed.

In the drawings:

Figure 1 is a rear elevation of a dusting machine constructed in accordance with the present invention;

Figure 2 is a vertical longitudinal sectional view on line 2—2 of Figure 3, through a portion of the boom and one of the dust spray nozzles;

Figure 3 is a transverse sectional view on line 3—3 of Figure 2;

Figure 4 is a longitudinal sectional view partly in elevation, showing the manner of hingedly connecting the two sections of the boom;

Figure 5 is a fragmentary perspective view showing the mounting and locking means for the boom;

Figure 6 is a sectional view showing one example of dusting head which may be used to supply the dust to the tubular boom; and Figure 7 is a side elevation showing the boom folded and in transporting position.

The construction shown in the drawings will be rather specifically described but it is to be understood that numerous variations may be made within the scope of the invention as claimed.

A suitable chassis frame 10 is mounted on an axle 11 having ground wheels 12. A tongue 13 is provided for the frame, said tongue having any suitable hitch for connection with a tractor. The axle 11 is extensible and retractable to vary the wheel spacing according to the distance between the rows of the crop to be dusted.

A dusting head 14 is mounted on the chassis frame 10 and delivers the dust, suspended in a blast of air, to the boom 15, and said boom is equipped with a plurality of dust spray nozzles 16.

At its inner end, the boom is mounted to be swung vertically and horizontally when required, as hereinafter explained, the mounting means being generally denoted at 17. To raise said boom when required, a hydraulic-cylinder-and-piston-assembly 18 and cables 19 are provided. These elements 18 and 19 also prevent the boom from sagging during use.

To facilitate movement of the machine from place to place, the boom 15 is swingable rearwardly to a position (Fig. 7) in which it extends longitudinally of the machine, and to avoid excessive rearward projection of said boom, it is formed from an inner longitudinal section 20 and an outer longitudinal section 21 connected by a special joint 22 which allows the outer section 21 to be folded upon the inner section 20. Toward the rear of the machine, a seat 23 is provided to support the folded and rearwardly swung boom. The cables 19 may be wrapped around the folded boom when the latter is supported in transportation position, as seen in Figure 7.

supported in transporting position, as seen in Figure 7.

ployed, is more or less diagrammatically shown in Figure 6. It includes a dust hopper 24 which delivers the dust through a valve-controlled opening 25 into a tube 26 through which a blast of air is driven by a blower 27 at one end of said tube. The other end of this tube is flexibly connected by a base 28 with the inner end of the boom 15. A driving motor for the blower 27 is indicated at 29 in Figure 1 and there may be any desired driving connections from said motor to said blower.

Adjacent the dusting head 14 and motor 29 there is a suitable operator's platform 30 which is preferably of such size that it may carry a plurality of sacks of dust to be dumped into the hopper 24 as required. A hook 31 is also provided for the empty sacks. This hook is carried by a suitably braced standard 32 to which the cylinder-and-piston-assembly 18 is swingably connected, for example, by means of a hook 33 and link 34. The standard 32 may also carry a spot-light 35 for use when operating the machine at night.

At one side of the chassis frame 10, there is an upstanding arched frame 36, the crown bar 37 of which extends longitudinally of the machine. The front portion of this arched frame 36 carries the boom mounting means 17, and the rear portion of said frame carries a post 38 upon which the boom seat 23 is mounted. The boom mounting means 17 is shown in detail in Figure 5 to which reference is now made.

A U-shaped yoke 39 rests on the crown bar 37 of the arched frame 36 and is connected with said crown bar by a vertical pivot 40. The side arms 39a and 39b of this yoke 39 straddle the inner end portion of the boom 15 and said boom is pivoted by a horizontal bolt or the like 41 to said side arms. Thus, the boom may be swung vertically upon the pivot 41 and horizontally about the pivot 40. The yoke 39 is shown as provided with a lug 42 through an opening of which a pin 43 may be inserted into an opening in the crown bar 37 to hold the boom in its lateral position for use. Also, to aid in holding the boom in operative horizontal position, a link 44 may be provided to connect a lug 45 on said boom with the upper end of the yoke 39. One end of this link may be released when the boom is to be swung rearwardly and engaged with the seat 23 for transportation.

The joint 22 between the boom sections 20 and 21 is shown in detail in Figure 4. This joint includes two sleeves 46 and 47 welded around the adjacent ends of the boom sections 20 and 21 respectively. Upper lugs 48 and 49 are provided on the sleeves 46 and 47 respectively, and these lugs are connected by a transverse hinge pin 50. Lower lugs 51 and 52 are provided on the sleeves 46 and 47, respectively, and these lugs are normally connected by an easily removable lock pin 53. A suitable gasket 54 is provided between the sleeves 46 and 47 and is secured to one of these sleeves. As long as the lock pin 53 is in place, the two boom sections 20 and 21 are rigidly connected, but removal of said pin 53 permits the outer section 21 to be folded upon the inner section 20, as indicated by the arrow in Figure 4. Thus, the boom need not project excessively rearward when engaged with the seat 23 for movement of the machine from one place to another.

The construction of one of the spray nozzles 16 is shown in Figures 2 and 3 and all of said nozzles are identical. The nozzle includes parallel front and rear walls 54 and 55, angular end walls 56 which downwardly flare the nozzle toward the right and left, angular partitions 57, and a vertical central partition 58, said partitions being arranged to insure about equal distribution of dust from end to end of the nozzle. Over the partitions is an adjustable gate 59 which may be set to allow the desired amount of dust to be blown into and from the nozzle. By properly setting the gates 59 of the various nozzles, relatively, uniform discharge of dust throughout the length of the boom 15 may be insured.

From the foregoing it will be seen that a novel and advantageous machine has been provided for attaining the desired ends. However, it is to be understood that the present disclosure is to a large extent illustrative rather than limiting, as various changes may be made within the scope of the invention as claimed.

What is claimed is:

1. In a dusting machine, a wheeled chassis frame, a dust spraying boom to extend laterally from said chassis frame for use, a U-shaped yoke straddling the inner end portion of said boom, a horizontal pivot connecting said boom with said yoke, a support on said chassis frame upon which said yoke rests, a vertical pivot connecting said yoke with said support, means for raising and lowering said boom about said horizontal pivot, and releasable means for normally holding said yoke against turning about said vertical pivot, said boom being swingable to a position extending longitudinally of said chassis frame, when the last mentioned means is released.

2. A structure as specified in claim 1; said support comprising an arched frame extending longitudinally of said chassis frame, said yoke being disposed at the front end of said arched frame, and a seat supported by the rear end of said arched frame to support said boom when the latter is swung to said longitudinal position.

3. A structure as specified in claim 1; together with a link releasably connecting said boom with said yoke for holding said boom in horizontal position for use, said link being vertically spaced from said horizontal pivot.

References Cited in the file of this patent

UNITED STATES PATENTS

| Number | Name | Date |
| --- | --- | --- |
| 510,287 | Peppler | Dec. 5, 1893 |
| 576,818 | McGraw | Feb. 9, 1897 |
| 637,118 | Hopper | Nov. 14, 1899 |
| 2,132,727 | Foote | Oct. 11, 1938 |
| 2,211,759 | Pitner | Aug. 20, 1940 |
| 2,221,433 | Pitner | Nov. 12, 1940 |
| 2,283,805 | Gustafson | May 19, 1942 |
| 2,541,417 | Hartsock | Feb. 13, 1951 |
| 2,691,236 | Tuft | Oct. 12, 1954 |